United States Patent
Takahashi et al.

(10) Patent No.: US 9,357,531 B2
(45) Date of Patent: May 31, 2016

(54) RADIO BASE STATION AND MOBILE STATION

(71) Applicant: NTT DOCOMO, INC., Tokyo (JP)

(72) Inventors: Hideaki Takahashi, Tokyo (JP); Tooru Uchino, Tokyo (JP); Yuta Sagae, Tokyo (JP); Anil Umesh, Tokyo (JP); Kengo Yagyu, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 149 days.

(21) Appl. No.: 14/376,042

(22) PCT Filed: Feb. 1, 2013

(86) PCT No.: PCT/JP2013/052378
§ 371 (c)(1),
(2) Date: Jul. 31, 2014

(87) PCT Pub. No.: WO2013/115377
PCT Pub. Date: Aug. 8, 2013

(65) Prior Publication Data
US 2015/0016372 A1    Jan. 15, 2015

(30) Foreign Application Priority Data
Feb. 3, 2012 (JP) .................. 2012-021970

(51) Int. Cl.
*H04L 5/00* (2006.01)
*H04W 88/08* (2009.01)
*H04W 72/04* (2009.01)
*H04W 72/12* (2009.01)

(52) U.S. Cl.
CPC ........... *H04W 72/0406* (2013.01); *H04L 5/001* (2013.01); *H04L 5/0098* (2013.01); *H04W 72/1289* (2013.01); *H04W 88/08* (2013.01)

(58) Field of Classification Search
None
See application file for complete search history.

(56) References Cited

U.S. PATENT DOCUMENTS

| 2011/0105107 A1* | 5/2011 | Kwon | H04W 48/08 455/422.1 |
| 2011/0243106 A1* | 10/2011 | Hsu | H04L 5/0096 370/336 |

OTHER PUBLICATIONS

International Search Report for corresponding International Application No. PCT/JP2013/052378, mailed Apr. 2, 2013 (1 page).
"Discussion on activation and deactivation MAC CE;" ZTE; 3GPP TSG-RAN WG2 Meeting #72, R2-106330; Jacksonville, USA; Nov. 15-19 (4 pages).
"MAC CE for SCells (de)activation;" Fujitsu; 3GPP TSG-RAN WG2 Meeting #71bis, R2-105644; Xi'an, China, Oct. 11-15, 2010 (2 pages).
"MAC CE Format for Scell Activation Deactivation;" LG Electronics Inc.; 3GPP TSG-RAN2 Meeting #70bis, R2-103934; Stockholm, Sweden; Jun. 28-Jul. 2, 2010 (3 pages).
"UL SCC (de)activation;" Huawei; 3GPP TSG-RAN WG2 Meeting #70, R2-103011; Montreal, Canada; May 10-14, 2010 (3 pages).

(Continued)

*Primary Examiner* — Derrick Ferris
*Assistant Examiner* — Jay Vogel
(74) *Attorney, Agent, or Firm* — Osha Liang LLP

(57) ABSTRACT

A mobile station UE according to the present invention includes a controller unit 22. When "1" is set in "R" in the "Activation/Deactivation MAC Control Element", the controller unit 22 activates only an uplink in a Scell corresponding to "Ci" set to "1", and deactivates only the uplink in a Scell corresponding to "Ci" set to "0".

2 Claims, 3 Drawing Sheets

(56) References Cited

OTHER PUBLICATIONS

3GPP TS 36.300 V9.9.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 9);" Dec. 2011 (174 pages).

3GPP TS 36.321 V11.1.0; "3rd Generation Partnership Project; Technical Specification Group Radio Access Network; Evolved Universal Terrestrial Radio Access (E-UTRA); Medium Access Control (MAC) protocol specification (Release 11);" Dec. 2012 (57 pages).

\* cited by examiner

RADIO BASE STATION AND MOBILE STATION

TECHNICAL FIELD

The present invention relates to a radio base station and a mobile station.

BACKGROUND ART

In CA (Carrier Aggregation) using a cell #1 (for example, a macro cell) and a cell #11 (for example, a pico cell) in a "Heterogeneous Network" of LTE (Long Term Evolution)-Advanced, one can expect a case where, at an edge of an area covered by the cell #11, the uplink is out of synchronization while the downlink provides good quality, as shown in FIG. 1.

In such a case, it is considered that a radio base station eNB#11 uses the following two methods for continuously scheduling downlink data signals to the mobile station UE.

A first method is a method in which the radio base station eNB#11 allocates no resources for transmitting the uplink data signal (PUSCH: Physical Uplink Shared Channel) to the mobile station UE in the cell #11.

Such a method, however, has a problem that since the mobile station UE must transmit SRS (Sounding Reference Signal) even if the mobile station UE is not assigned a resource for transmitting the uplink data signal by the radio base station eNB#11, the SRS acts as an interference source to the adjacent cell #1.

A second method is a method in which the radio base station eNB#11 deactivates only the uplink in the cell #11 by RRC signaling.

Such a method, however, has a problem of increasing the load to the RRC signaling.

For solving the foregoing problems, in the LTE specification development meeting, a method as shown in FIG. 6 was proposed in which the radio base station eNB#11 independently uses a MAC Control Element for activating and deactivating the uplink in the Scell, and a MAC Control Element for activating and deactivating the downlink in the Scell (see non-patent document 1).

PRIOR ART DOCUMENT

Non-Patent Document

Non-patent document 1: 3GPP Contributed Article R2-103011
Non-patent document 2: 3GPP Specification TS36.300
Non-patent document 3: 3GPP Specification TS36.321

SUMMARY OF THE INVENTION

The method according to the non-patent document 1, however, has a problem that the number of bits of the MAC Control Element needed for activating and deactivating the Scell needs to be increased.

The applicant has focused on a point that one can expect a case where the uplink is out of synchronization while the downlink is in good quality as shown in FIG. 1, but no one can expect a case where the uplink is in good quality while the downlink is out of synchronization. That is, the applicant has arrived at the idea that only the downlink in the Scell does not need either of activation and deactivation.

The present invention has been made in view of the above-mentioned problem. An objective of the present invention is to provide a radio base station and a mobile station, which are capable of continuously scheduling the downlink data signal without increasing the number of bits of the MAC Control Element needed to activate and deactivate the Scell, in a case where the uplink is out of synchronization, while the downlink is in good quality.

A first feature of the present invention is summarized as a radio base station, the radio base station including: a transmitter unit configured to transmit a MAC control element to a mobile station, the MAC control element including a reserved bit of one bit and status bits each indicating whether a corresponding one of secondary cells is activated or deactivated; and a controller unit configured to set the status bits and the reserved bit in the MAC control element. Here, the controller unit is configured to set "0" in the reserved bit and "1" in the status bit corresponding to a target secondary cell when both an uplink and a downlink in the target secondary cell are desired to be activated, the controller unit is configured to set "0" in the reserved bit and "0" in the status bit corresponding to the target secondary cell when both the uplink and the downlink in the target secondary cell are desired to be deactivated, the controller unit is configured to set "1" in the reserved bit and "1" in the status bit corresponding to the target secondary cell when only the uplink in the target secondary cell is desired to be activated, and the controller unit is configured to set "1" in the reserved bit and "0" in the status bit corresponding to the target secondary cell when only the uplink in the target secondary cell is desired to be deactivated.

A second feature of the present invention is summarized as a mobile station, the mobile station including: a receiver unit configured to receive a MAC control element from a radio base station, the MAC control element including a reserved bit of one bit and status bits each indicating whether a corresponding one of secondary cells is activated or deactivated; and a controller unit configured to activate or deactivate the secondary cells based on the status bits and the reserved bit in the MAC control element. Here, when "0" is set in the reserved bit, the controller unit activates both an uplink and a downlink in a secondary cell corresponding to the status bit set to "1", and deactivates both the uplink and the downlink in a secondary cell corresponding to the status bit set to "0", and when "1" is set in the reserved bit, the controller unit activates only the uplink in a secondary cell corresponding to the status bit set to "1", and deactivates only the uplink in a secondary cell corresponding to the status bit set to "0".

As described above, an aspect of the present invention provides a radio base station and a mobile station, which are capable of continuously scheduling the downlink data signal without increasing the number of bits of the MAC Control Element needed to activate and deactivate the Scell, in a case where the uplink is out of synchronization, while the downlink is in good quality.

DETAILED DESCRIPTION (Mobile communication system according to first embodiment of the present invention)

A mobile communication system according to a first embodiment of the present invention is described with reference to FIG. 1 and FIG. 5.

Figure 1:
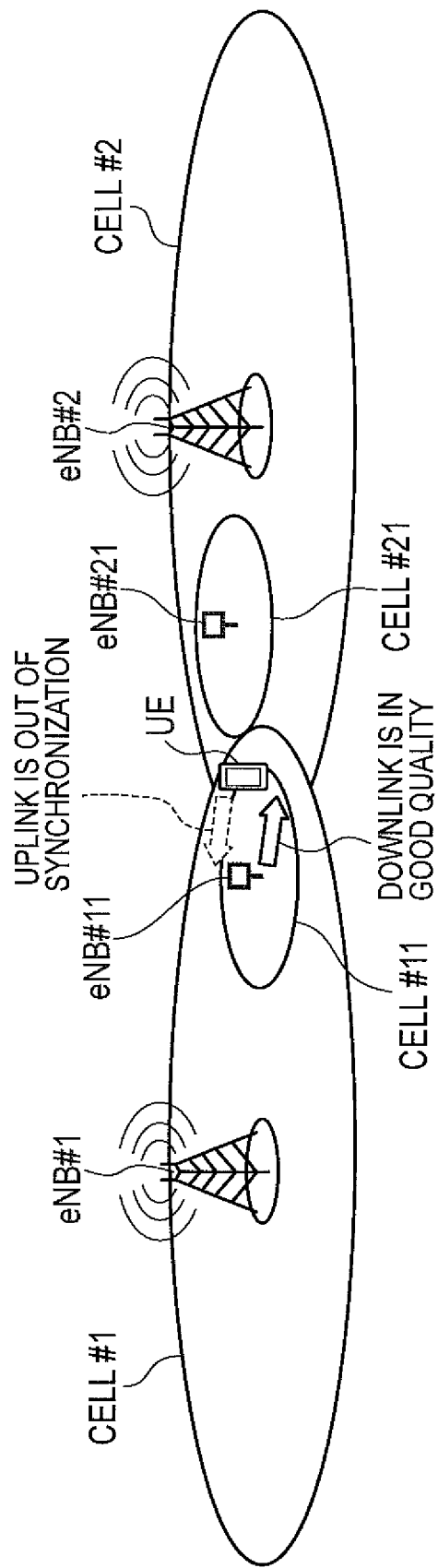
FIG. 1 is an overall configuration diagram of a mobile communication system according to a first embodiment of the present invention.

As shown in FIG. 1, the mobile communication system according to this embodiment supports LTE-Advanced and is configured to be capable of performing CA.

As shown in FIG. 1, the mobile communication system according to this embodiment includes a radio base station eNB#1 configured to manage a cell #1, a radio base station eNB#2 configured to manage a cell #2, a radio base station eNB#11 configured to manage a cell #11, and a radio base station eNB#21 configured to manage a cell #21.

Here, cells #1 and #2 are cells operated by a frequency carrier in the coverage band supporting a wide area (for example, macro cells).

On the other hand, cells #11 and #21 are cells each operated by a frequency carrier in the capacity band for improving the throughput in a hot spot (for example, pica cells), and are disposed respectively in areas covered by the cell #1 and the cell #2.

In an example of FIG. 1, the cell #1 is set as "Pcell (Primary Cell)" for a mobile station UE, while cell #11 is set and activated as "Scell (Secondary Cell)" for the mobile station UE.

Configurations of radio base stations eNB#1, eNB#2, eNB#11, and eNB#21 according to this embodiment are basically the same. Therefore, a configuration of the radio base station eNB#11 is described as a representative thereof.

Figure 2:
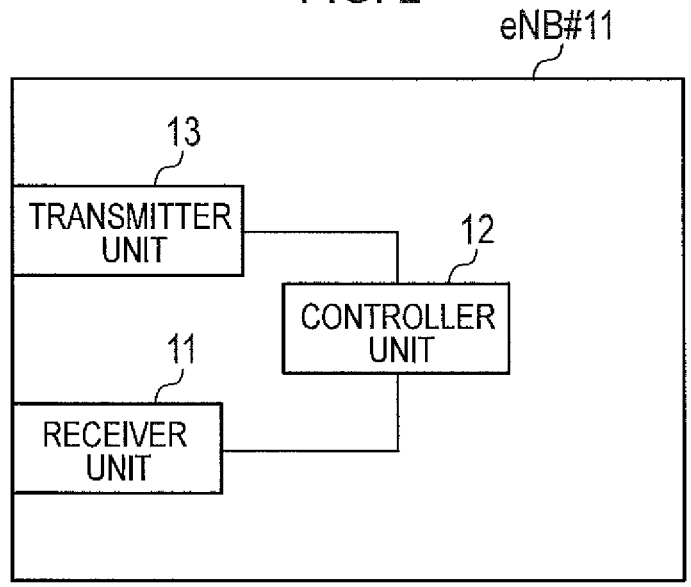
FIG. 2 is a functional block diagram of a radio base station according to the first embodiment of the present invention.

As shown in FIG. 2, the radio base station eNB#11 includes a receiver unit 11, a controller unit 12, and a transmitter unit 13.

The receiver unit 11 is configured to receive various signals transmitted by the mobile station UE, the transmitter unit 13 is configured to transmit various signals to the mobile station PE, and the controller unit 12 is configured to perform various controls at the radio base station eNB#11.

Specifically, the controller unit 12 may be configured to set "Ci" and "R" in the "Activation/Deactivation MAC Control Element".

Here, "Ci" represents a status bit indicating that each Scell#i is activated or deactivated, while "R" represents a reserved bit of one bit. Scell#i indicates a Scell of ScellIndex#i.

Figure 3:
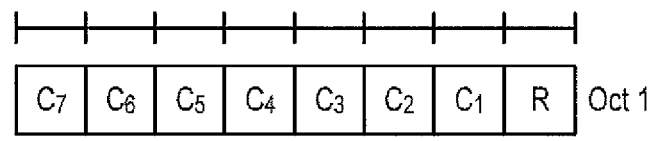
FIG. 3 is a diagram for illustrating operations of the radio base station according to the first embodiment of the present invention.

For example, as shown in FIG. 3, the "Activation/Deactivation MAC Control Element" includes 8 bits (1 octet) and has status bits "$C_1$" to "$C_7$" (7 bits) which indicate that Scells #1 to #7 are activated or deactivated.

For example, the controller unit 12 may be configured to set "0" in "R" and "1" in "Ci" corresponding to a target Scell when both the uplink and the downlink in the target Scell are desired to be activated.

Further, the controller unit 12 may be configured to set "0" in "R" and "0" in "Ci" corresponding to the target Scell when both the uplink and the downlink in the target Scell are desired to be deactivated.

On the other hand, the controller unit 12 may be configured to set "1" in "R" and "1" in "Ci" corresponding to the target Scell when only the uplink in the target Scell is desired to be activated (for example, a case where the uplink is out of synchronization while the downlink is in good quality).

Further, the controller unit 12 may be configured to set "1" in "R" and "0" in "Ci" corresponding to the target Scell when only the uplink in the target Scell is desired to be deactivated (for example, a case where the uplink is out of synchronization while the downlink is in good quality).

Further, the controller unit 12 may be configured to reversely use "0" and "1" as values set in "Ci" and "R" described above.

The transmitter unit 13 is configured to transmit the "Activation/Deactivation MAC Control Element" generated by the controller unit to the mobile station UE.

Figure 4:
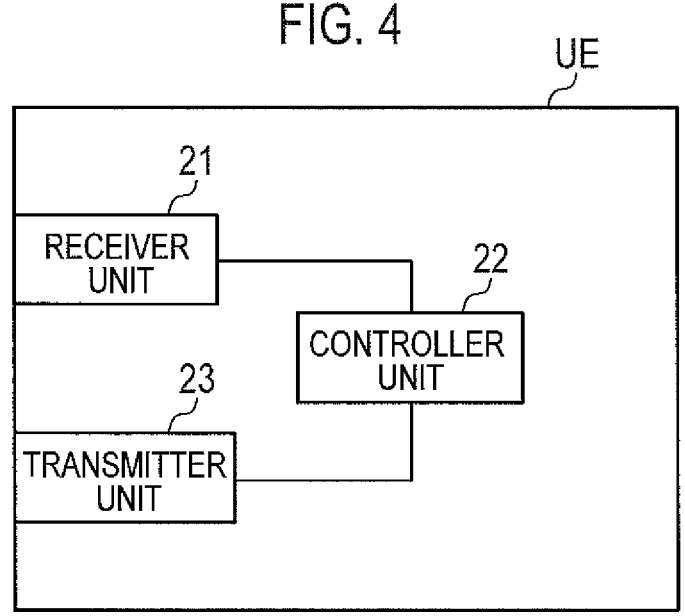
FIG. 4 is a functional block diagram of a mobile station according to the first embodiment of the present invention.

As shown in FIG. 4, the mobile station UE according to this embodiment includes a receiver unit 21, a controller unit 22, and a transmitter unit 23.

The receiver unit 21 is configured to receive various signals transmitted by a radio base station eNB, the transmitter unit 23 is configured to transmit various signals to the radio base station eNB, and the controller unit 22 is configured to perform a various controls in the mobile station UE.

Specifically, the receiver unit 21 may be configured to receive, from the radio base station eNB, the "Activation/Deactivation MAC Control Element" including "R" of one bit and "Ci" which indicates that each Scell#i is activated or deactivated.

Further, the controller unit 22 may be configured to activate or deactivate each Scell#i based on "Ci" and "R" in the "Activation/Deactivation MAC Control Element".

For example, the controller unit 22 may be configured to, when "0" is set in "R" in the "Activation/Deactivation MAC Control Element" received by the receiver unit 21, activate both the uplink and the downlink in a Scell#i corresponding to "Ci" set to "1" in the "Activation/Deactivation MAC Control Element", and deactivate both the uplink and the downlink in a Scell#i corresponding to "Ci" set to "0" in the "Activation/Deactivation MAC Control Element".

On the other hand, the controller unit 22 may be configured to, when "1" is set in "R" in the "Activation/Deactivation MAC Control Element" received by the receiver unit 21, activate only the uplink in a Scell#i corresponding to "Ci" set to "1" in the "Activation/Deactivation MAC Control Element", and deactivate only the uplink in a Scell#i corresponding to "Ci" set to "0" in the "Activation/Deactivation MAC Control Element".

In such a case, the controller unit 22 may be configured to keep the uplink in the Scell#i corresponding to the "Ci" in a status before reception of the "Activation/Deactivation MAC Control Element".

Hereinafter, operations of the mobile station UE according to this embodiment are described with reference to FIG. 5.

Figure 5:
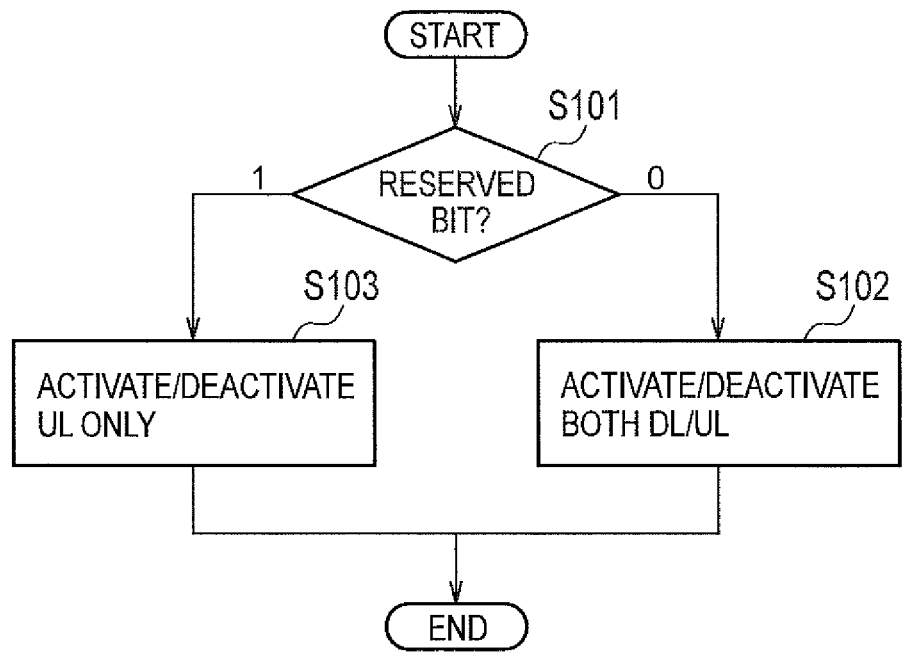
FIG. 5 is a flowchart showing operations of the mobile station according to the first embodiment of the present invention.
Figure 6:
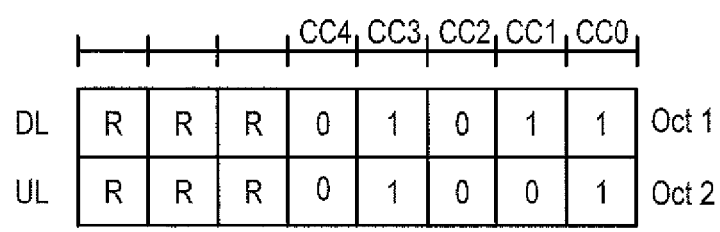
FIG. 6 is a diagram for illustrating a conventional mobile communication system.

As shown in FIG. 5, upon receiving the "Activation/Deactivation MAC Control Element" from the radio base station eNB, the mobile station CE determines at step S101 whether "0" or "1" is set in "R" in the "Activation/Deactivation MAC Control Element".

When it is determined that "0" is set, the operation proceeds to step S102. When it is determined that "1" is set, the operation proceeds to step S103.

At step S102, the mobile station CE activates both the uplink and the downlink in a Scell#i corresponding to "Ci" set to "1" in the "Activation/Deactivation MAC Control Element", and deactivates both the uplink and the downlink in a Scell#i corresponding to "Ci" set to "0" in the "Activation/Deactivation MAC Control Element".

At step S103, the mobile station CE activates only the uplink in a Scell#i corresponding to "Ci" set to "1" in the "Activation/Deactivation MAC Control Element", and deactivates only the uplink in a Scell#i corresponding to "Ci" set to "0" in the "Activation/Deactivation MAC Control Element".

According to an aspect of this embodiment, each of Scells may be switched in terms of whether to deactivate both the uplink and the downlink or whether to deactivate only the uplink by using "R" in the "Activation/Deactivation MAC Control Element" shown in FIG. 3. Therefore, in a case where the uplink is out of synchronization while the downlink is in good quality, downlink data signals may be continuously scheduled without increasing the number of bits of the existing "Activation/Deactivation MAC Control Element".

The features of this embodiment described above may be expressed as follows.

A first feature of this embodiment is summarized as a radio base station eNB, the radio base station eNB including: a transmitter unit 13 configured to transmit an "Activation/Deactivation MAC Control Element (MAC control element)" to a mobile station UE, the MAC control element including an "R (reserved bit)" of one bit and "Ci (status bits)" each indicating whether a corresponding one of Scells#i (secondary cells) is activated or deactivated; and a controller unit 12 configured to set the "Ci" and the "R" in the "Activation/Deactivation MAC Control Element". Here, the controller unit 12 is configured to set "0" in the "R" and "1" in the "Ci" corresponding to a target Scell when both an uplink and a downlink in the target Scell are desired to be activated, the controller unit 12 is configured to set "0" in the "R" and "0" in the "Ci" corresponding to the target Scell when both the uplink and the downlink in the target Scell are desired to be deactivated, the controller unit 12 is configured to set "1" in the "R" and "1" in the "Ci" corresponding to the target Scell when only the uplink in the target Scell is desired to be activated, and the controller unit 12 is configured to set "1" in the "R" and "0" in the "Ci" corresponding to the target Scell when only the uplink in the target Scell is desired to be deactivated.

A second feature of this embodiment is summarized as a mobile station UE, the mobile station UE including: a receiver unit 21 configured to receive an "Activation/Deactivation MAC Control Element" from a radio base station eNB, the "Activation/Deactivation MAC Control Element" including an "R" of one bit and "Ci" each indicating whether a corresponding one of Scells#i is activated or deactivated; and a controller unit 22 configured to activate or deactivate Scells #1 to #7 based on the "Ci" and the "R" in the "Activation/Deactivation MAC Control Element". Here, when "0" is set in the "R", the controller unit 22 activates both an uplink and a downlink in a Scell corresponding to the "Ci" set to "1", and deactivates both the uplink and the downlink in a Scell corresponding to the "Ci" set to "0". And, when "1" is set in the "R", the controller unit 22 activates only the uplink in a Scell corresponding to the "Ci" set to "1", and deactivates only the uplink in a Scell corresponding to the "Ci" set to "0".

It should be noted that the foregoing operations of the mobile station UE and the radio base station eNB may be implemented by hardware, may be implemented by a software module executed by a processor, or may be implemented in combination of the two.

The software module may be provided in a storage medium in any format, such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, or CD-ROM.

The storage medium is connected to a processor so that the processor can read and write information from and to the storage medium. Instead, the storage medium may be integrated in a processor. The storage medium and the processor may be provided inside an ASIC. Such an ASIC may be provided in the mobile station UE and the radio base station eNB. Otherwise, the storage medium and the processor may be provided as discrete components inside the mobile station UE and the radio base station eNB.

Hereinabove, the present invention has been described in detail by use of the foregoing embodiments. However, it is apparent to those skilled in the art that the present invention should not be limited to the embodiments described in the specification. The present invention can be implemented as an altered or modified embodiment without departing from the spirit and scope of the present invention, which are determined by the description of the scope of claims. Therefore, the description of the specification is intended for illustrative explanation only and does not impose any limited interpretation on the present invention.

EXPLANATION OF THE REFERENCE NUMERALS eNB radio base station
UE mobile station
11, 21 receiver unit
12, 22 control unit
13, 23 transmitter unit

The invention claimed is:

1. A radio base station, comprising:
a transmitter unit configured to transmit a MAC control element to a mobile station, the MAC control element including a reserved bit of one bit and status bits each indicating whether a corresponding one of secondary cells is activated or deactivated; and
a controller unit configured to set the status bits and the reserved bit in the MAC control element,
wherein the controller unit is configured to set "0" in the reserved bit and "1" in the status bit corresponding to a target secondary cell when both an uplink and a downlink in the target secondary cell are desired to be activated,
the controller unit is configured to set "0" in the reserved bit and "0" in the status bit corresponding to the target secondary cell when both the uplink and the downlink in the target secondary cell are desired to be deactivated,
the controller unit is configured to set "1" in the reserved bit and "1" in the status bit corresponding to the target secondary cell when only the uplink in the target secondary cell is desired to be activated, and
the controller unit is configured to set "1" in the reserved bit and "0" in the status bit corresponding to the target secondary cell when only the uplink in the target secondary cell is desired to be deactivated.

2. A mobile station, comprising:
a receiver unit configured to receive a MAC control element from a radio base station, the MAC control element including a reserved bit of one bit and status bits each indicating whether a corresponding one of secondary cells is activated or deactivated; and
a controller unit configured to activate or deactivate the secondary cells based on the status bits and the reserved bit in the MAC control element,
wherein when "0" is set in the reserved bit, the controller unit activates both an uplink and a downlink in a secondary cell corresponding to the status bit set to "1", and deactivates both the uplink and the downlink in a secondary cell corresponding to the status bit set to "0", and when "1" is set in the reserved bit, the controller unit activates only the uplink in a secondary cell corresponding to the status bit set to "1", and deactivates only the uplink in a secondary cell corresponding to the status bit set to "0".

* * * * *